United States Patent
Oestreicher et al.

(10) Patent No.: US 11,800,403 B2
(45) Date of Patent: Oct. 24, 2023

(54) METHOD AND SYSTEM FOR CONTROLLING PHYSICAL DATA RATE

(71) Applicant: Rohde & Schwarz GmbH & Co. KG, Munich (DE)

(72) Inventors: Lars Oestreicher, Munich (DE); Alex Bart, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 52 days.

(21) Appl. No.: 17/554,884

(22) Filed: Dec. 17, 2021

(65) Prior Publication Data
US 2022/0240124 A1    Jul. 28, 2022

(30) Foreign Application Priority Data

Jan. 27, 2021    (EP) ..................................... 21153740

(51) Int. Cl.
*H04W 28/08*    (2023.01)
*H04W 28/22*    (2009.01)
(Continued)

(52) U.S. Cl.
CPC ......... *H04W 28/0983* (2020.05); *H04L 47/15* (2013.01); *H04W 8/04* (2013.01); *H04W 28/082* (2023.05); *H04W 4/06* (2013.01)

(58) Field of Classification Search
CPC . H04W 28/0983; H04W 8/04; H04W 28/085; H04W 4/00; H04W 4/06;
(Continued)

(56) References Cited

U.S. PATENT DOCUMENTS

2005/0041681 A1* 2/2005 Lee ........................ H04W 72/23
370/437
2017/0303114 A1 10/2017 Johansson et al.
(Continued)

FOREIGN PATENT DOCUMENTS

EP    3101922 A1    12/2016
EP    3672289 A1    6/2020
(Continued)

OTHER PUBLICATIONS

Ghandri, A. et al., "Dynamic MBSFN Subframe Allocation Algorithm for Bursty Video Traffic in LTE-Advanced Network," 2018 IEEE Wireless Communications and Networking Conference (WCNC), Apr. 15, 2018, 6 pages.

*Primary Examiner* — Mohamed A Kamara
(74) *Attorney, Agent, or Firm* — CHRISTENSEN O'CONNOR JOHNSON KINDNESS PLLC

(57) ABSTRACT

Embodiments of the present disclosure relate to a method of controlling physical data rate for optimizing throughput of multicast transport channels in at least one multicast channel, wherein the allocation of the at least one multicast transport channel to the at least one multicast channel is controlled such that inter alia at least one of all multicast transport channels to be allocated currently is placed within one multicast channel during the common sub-frame allocation period according to a pre-defined ruling when all multicast transport channels to be allocated currently do not fit into the one multicast channel, wherein a remainder of all multicast transport channels to be allocated currently is buffered and scheduled to be transmitted in a following common sub-frame allocation period. Further, a system for controlling physical data rate for optimizing throughput of multicast transport channels is described.

17 Claims, 1 Drawing Sheet

(51) Int. Cl.
*H04L 47/10* (2022.01)
*H04W 8/04* (2009.01)
*H04W 28/082* (2023.01)
*H04W 4/06* (2009.01)

(58) Field of Classification Search
CPC ..... H04W 72/30; H04W 28/22; H04W 72/00; H04W 72/52; H04W 72/569; H04W 72/0453; H04W 72/54; H04W 72/56; H04L 47/15; H04L 5/005
See application file for complete search history.

(56) References Cited

U.S. PATENT DOCUMENTS

| | | |
|---|---|---|
| 2018/0227717 A1 | 8/2018 | Bhardwaj et al. |
| 2019/0090103 A1 | 3/2019 | Panchal et al. |

FOREIGN PATENT DOCUMENTS

| | | | |
|---|---|---|---|
| WO | 2016124980 A1 | 8/2016 | |
| WO | 2019033915 A1 | 2/2019 | |

\* cited by examiner

METHOD AND SYSTEM FOR CONTROLLING PHYSICAL DATA RATE

FIELD OF THE DISCLOSURE

Embodiments of the present disclosure relate to methods of controlling physical data rate for optimizing throughput of multicast transport channels in at least one multicast channel. Further, embodiments of the present disclosure relate to systems for controlling physical data rate for optimizing throughput of multicast transport channels in at least one multicast channel.

BACKGROUND

In the state of the art, systems and methods are known that are used for multicasting content, for instance broadcasting purposes. Typically, several different services are provided that have to be allocated or rather scheduled in order to ensure that the respective services can be provided in an efficient manner. The services may relate to radio, television and/or telecommunication services. Since the number of services is increasing, a more efficient scheduling of the several different services is required. Therefore, Multimedia Broadcast Multicast Services (MBMS) have been used that provide an efficient delivery of multicast services, for example via a single-frequency network (SFN) configuration.

In addition, modern mobile communication standards like Long Term Evolution (LTE), 5G or rather 5G-NR (New Radio) have been employed/developed which increase the capacity and speed of the respective network used.

In LTE technology, the respective MBMS is referred to as evolved Multimedia Broadcast Multicast Services (eMBMS), which is also known as LTE Broadcast. With eMBMS, up to 60% of the capacity may be allocated to broadcast services under ideal conditions. The main applications of eMBMS or rather LTE Broadcast concern mobile TV, radio broadcasting, live streaming video services as well as file delivery.

In the meantime, technologies like. Further evolved Multimedia Broadcast Multicast Services (FeMBMS) have been deployed that provide a significant enhancement to the previous eMBMS since FeMBMS enables up to 100% of the capacity to be dedicated to broadcast services under ideal conditions.

However, the respective technologies mentioned above have in common that the number of services provided increase, thereby requiring an efficient scheduling of the different services in order to use the respective multicast channel to full capacity under real conditions.

Accordingly, there is a need for a method and system that ensure an optimized throughput, namely an optimized sum of the data rates that are delivered to all participants/terminals in a respective network.

SUMMARY

Embodiments of the present disclosure provide methods of controlling physical data rate for optimizing throughput of multicast transport channels in at least one multicast channel. In an embodiment, at least one multicast transport channel is allocated to at least one multicast channel during a common sub-frame allocation period. The allocation of the at least one multicast transport channel to the at least one multicast channel is controlled such that:

all multicast transport channels to be allocated currently are placed within one multicast channel during the common sub-frame allocation period when all multicast transport channels to be allocated currently fit into the one multicast channel during the common sub-frame allocation period, thereby leaving no unused physical data rate in the multicast channel irrespective of a capacity buffer;

at least one multicast transport channel to be allocated currently and at least one multicast transport channel waiting for being allocated are placed within one multicast channel during the common sub-frame allocation period when all multicast transport channels to be allocated currently fit into the one multicast channel during the common sub-frame allocation period, thereby leaving unused physical data rate in the multicast channel, wherein the unused physical data rate exceeds the capacity buffer; and at least one of all multicast transport channels to be allocated currently is placed within one multicast channel during the common sub-frame allocation period according to a pre-defined ruling when all multicast transport channels to be allocated currently do not fit into the one multicast channel, wherein a remainder of all multicast transport channels to be allocated currently is buffered and scheduled to be transmitted in a following common sub-frame allocation period.

Accordingly, the main idea is based on the finding that multiple multicast transport channels (MTCHs) can be scheduled efficiently by using the maximum available data rate in the respective multicast channel (MCH). The individual multicast transport channels scheduled are taken into account with respect to their individual data rates in order to evaluate if they fit into the multicast channel, namely the capacity provided by the multicast channel Depending on this evaluation, three different scenarios are applied in order to efficiently increase the overall throughput of the multicast channel by dynamically and individually allocating the different multicast transport channels, for instance re-scheduling at least one multicast transport channel if necessary. In other words, the maximum capacity of the multicast channel can be used during each common sub-frame allocation period (CSA period).

For instance, the several multicast transport channels may have a data rate up to 1 mbit, wherein several multicast transport channels are multiplexed into the single multicast channel having a 10 mbit data rate. However, the several multicast transport channels may have different data rates.

The multicast transport channels to be allocated currently may correspond to the multicast transport channels that are intended for being scheduled in the respective common sub-frame allocation period. However, it has to be evaluated if all of them can be scheduled actually, for example due to their individual data rates.

In the typical use case, the respective multicast transport channels to be allocated currently, namely the ones intended for being scheduled, fit into the one multicast channel such that they could be allocated accordingly. Further, the capacity of the multicast channel is not exhausted such that unused physical data rate may be left that exceeds the capacity buffer of the multicast channel. This relates to an underload of the multicast channel. The underload enables to allocate at least one waiting multicast transport channel to the multicast channel in the common sub-frame allocation period, wherein the waiting multicast transport channel has waited for being allocated. In other words, the waiting multicast transport channel may have been buffered in a previous common sub-frame allocation period. Accordingly, unused capacity of the multicast channel can be filled up by the multicast transport channel that waits for being allocated. Typically, the multicast transport channel waiting for being allocated corresponds to a multicast transport channel with a lower prioritization or rather temporally non-critical content.

The waiting multicast transport channel may be scheduled instead of a multicast transport channel to be allocated currently, for example in case that the waiting multicast transport channel has a higher data rate compared to the one that will be replaced. Thus, the unused capacity of the multicast channel is reduced.

In some embodiments, the number of multicast transport channels per multicast channel remains constant or stationary.

Accordingly, the individual data rates of the multicast transport channels, namely the ones to be allocated currently and the ones waiting, are taken into consideration during each common sub-frame allocation period in order to find an allocation of the different multicast channels within the multicast channel, wherein the respective allocation reduces the uses unused capacity of the multicast channel as much as possible.

Moreover, it may also be determined that the multicast transport channels to be allocated currently use the overall capacity of the multicast channel merely completely such that no unused physical data rate remains in the multicast channel irrespective of a certain capacity buffer, namely a buffer resource. However, the actually scheduled multicast transport channels still fit into the multicast channel such that neither an overload nor an underload of the multicast channel takes place. Therefore, this scenario corresponds to the best-case scenario or rather the ideal scenario, as substantially no capacity of the multicast channel is wasted and, in addition, a re-scheduling of multicast transport channels is not necessary. In other words, the capacity provided by the multicast channel is substantially used in its entirety by the multicast transport channels intended for being scheduled.

However, it may also happen that the sum of the data rates of the multicast transport channels to be allocated currently, namely the summed data rate of the multicast transport channels intended for being scheduled, exceeds the capacity of the multicast channel. Accordingly, it is not possible to allocate all of the multicast transport channels to be allocated currently in the common sub-frame allocation period. This corresponds to an overload of the multicast channel, for example its capacity. Accordingly, a re-scheduling is necessary in order to resolve the overload. Thus, at least one of the multicast transport channels intended for being allocated have to be buffered and (re-)scheduled to be transmitted in the following common sub-frame allocation period, thereby ensuring that no information is missed, but transmitted later. In some embodiments, multicast transport channels associated with temporally uncritical content may be re-scheduled.

The multicast transport channel buffered may, for example, be replaced by another multicast transport channel having a lower individual data rate, for instance a waiting one. This ensures that the number of multicast transport channels per multicast channel remains constant or rather stationary even though one of multicast transport channel to be allocated currently has been buffered.

The unused physical date rate is also called unused physical channel date rate (PCDR), which concerns the data rate of the physical channel, e.g. the physical multicast channel that is physically used for transmitting the respective content.

Generally, the information/data to be transmitted flows between different protocol layers that are also known as channels associated with different categories. The channels are used to segregate the different types of data and allow them to be transported across different layers. The channels further provide interfaces to the respective layers within the protocol stack, e.g., the LTE protocol stack, and enable a defined segregation of the data. In some embodiments, several different types of logical, transport and physical channels may be provided, which can be distinguished by the kind of information they carry and by the way in which the information is processed.

The physical multicast channel mentioned above is associated with the category of physical channels, whereas the multicast channel is associated with the category of transport channels. The multicast transport channel is associated with the category of logical channels.

The logical channels are generally used for carrying data between the Radio Link Control (RLC) layer and the Media Access Control (MAC) layer, whereas the transport channels are used for carrying data between the MAC layer and the Physical (PHY) layer. The physical channels are used for physically transporting the content/information to the respective communication partner.

An aspect provides that a protocol overhead caused in subsequent processing modules may be, for example, dynamically taken into account when allocating the multicast transport channels to be allocated currently in order to not exceed an overall physical data rate. In some embodiments, the overall physical data rate of a broadcast channel used shall not be exceeded. The protocol overhead caused by higher layer(s) may be taken into account when scheduling/allocating the multicast transport channels in case that an overload of the capacity of the multicast channel or an underload of the multicast channel takes place that requires a re-scheduling. As mentioned above, the under/overload results in a re-scheduling of at least one multicast transport channel, namely scheduling a multicast transport channel that was actually not scheduled (in case of an underload) or rather buffering a multicast transport channel that was actually scheduled (in case of an overload).

When taking the protocol overhead dynamically into account, padding bits/bytes can be reduced in the respective (higher) protocol layers, thereby ensuring that the used data rate can be maximized with respect to the maximum available data rate provided by the (physical) multicast channel. In other words, it is not necessary to add one or more extra bit(s)/byte(s) to a transmission in order to conform to a standard size, which is generally known as padding bits/bytes. Therefore, an efficient scheduling of multiple multicast transport channels is ensured.

Generally, the protocol overhead refers to the information that has to be sent with data (content) being routed through the network towards a destination. For instance, the protocol overhead concerns the information provided by the header. Depending on the exact network protocol being used, there can be a wide variety of information in the header, but most importantly are the destination address and the originating address. For instance, data packets sent using the transmission control protocol and Internet protocol (TCP/IP) have a protocol overhead somewhere in the range of 40 to 80 bytes per data packet.

As mentioned above, the protocol stack comprises inter alia the RLC layer, the MAC layer and the PHY layer, which each may be associated with a respective protocol overhead that may be taken into account when (re-)scheduling the multicast transport channels, namely allocating the multicast transport channels into the multicast layer.

Another aspect provides that sub-frame boundaries may be, for example, adjusted when allocating the at least one multicast transport channel to the at least one multicast channel. The capacity and, therefore, the efficiency can be increased further since the used data rate is optimized with respect to the maximum available data rate in the multicast channel in case of re-scheduling the multicast transport channels, for example in case of an overload/underload of the capacity of the multicast channel. The sub-frame boundaries can be adjusted in a dynamic manner depending on the multicast transport channels allocated and their respective individual data rates. Hence, the sub-frame boundaries provided between adjacent sub-frames may be reduced if necessary.

According to a further aspect, the amount of sub-frames per multicast transport channel within one multicast channel may be, for example, variable over several common sub-frame allocation periods. The allocation of the sub-frames to the respective multicast transport channels can vary over time, for example depending on the number of the multicast transport channels and/or their individual data rates.

Further, several multicast channels may be allocated during the common sub-frame allocation period. Thus, several multicast transport channels may be allocated to several different multicast channels simultaneously wherein the respective allocations are done simultaneously, namely within the common sub-frame allocation period. Accordingly, an interaction between different multicast channels may be performed such that multicast transport channels may be allocated to different multicast channels in order to increase the individual used capacity of the multicast channels appropriately.

The fitting of the multicast transport channels to be allocated currently into the one multicast channel may relate to a comparison of a summed data rate of the multicast transport channels to be allocated currently with an overall capacity of the multicast channel. In other words, it is evaluated whether the combined data rates of the individual multicast transport channels to be allocated currently, namely their sum, exceed the maximum available data rate of the multicast channel. Hence, it can be checked whether an overload scenario is provided or not.

The capacity buffer may be set by a threshold. The respective threshold may be set by an operator or rather pre-defined by a certain telecommunication standard applied in the network.

For instance, the capacity buffer amounts to maximum 5% of the maximum available capacity of the multicast channel, namely the maximum available data rate in the multicast channel. In some embodiments, the capacity buffer may amount to maximum 2% of the maximum available capacity of the multicast channel. In some embodiments, this depends on the respective technology used.

For instance, further evolved Multimedia Broadcast Multicast Service (FeMBMS) is used. Alternatively, evolved Multimedia Broadcast Multicast Service (eMBMS) may be used.

Another aspect provides that the pre-defined ruling may, for example, comprise a set of rules that is applied in order to prioritize the multicast transport channels to be allocated, thereby assigning a respective prioritization to each of the multicast transport channels to be allocated. Depending on the respective content associated with the multicast transport channel, the data to be transmitted may be prioritized differently. In some embodiments, temporally non-critical content is less prioritized compared to temporally critical content, resulting in different prioritizations of the individual multicast transport channels.

For instance, the multicast transport channels to be allocated are placed within the multicast channel during the common sub-frame allocation period according to their individual prioritizations. Therefore, it is ensured that multicast transport channels having a higher prioritization are scheduled such that they are transmitted or rather processed as early as possible, preferably during the common sub-frame allocation period intended. In contrast thereto, content associated with multicast transport channels of lower prioritization may be scheduled such that the respective content is transmitted/processed later, for instance during the following common sub-frame allocation period.

The respective individual prioritization may be adapted dynamically, for instance in case of a re-scheduling. Hence, the multicast transport channel postponed may be associated with a higher prioritization afterwards, thereby ensuring that the multicast transport channel postponed at least once will be scheduled in the following common sub-frame allocation period with a higher probability.

In addition, a buffer capacity for excess multicast transport channels may be provided. The excess multicast transport channels may correspond to the remainder of all multicast transport channels to be allocated currently.

In some embodiments, each of the multicast transport channels may be assigned to a respective service. Different kinds of services may be provided by the respective multicasting system.

The services may originate from different content providers and/or subscribers. Therefore, certain content providers and/or subscribers may be prioritized differently. Accordingly, services of a main content provider, for instance a network operator, may be allocated/transmitted during the originally designated common sub-frame allocation period. In a similar manner, different kinds of subscribers may be provided that are treated differently.

Generally, the services may relate to a data downlink, for instance a software download, or rather a service announcement. Hence, different prioritizations may be associated with these different kinds of service.

Further, embodiments of the present disclosure provide systems for controlling physical data rate for optimizing throughput of multiple multicast transport channels in at least one multicast channel. In an embodiment, a system comprises at least one scheduling module or circuit configured to perform the method described above.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
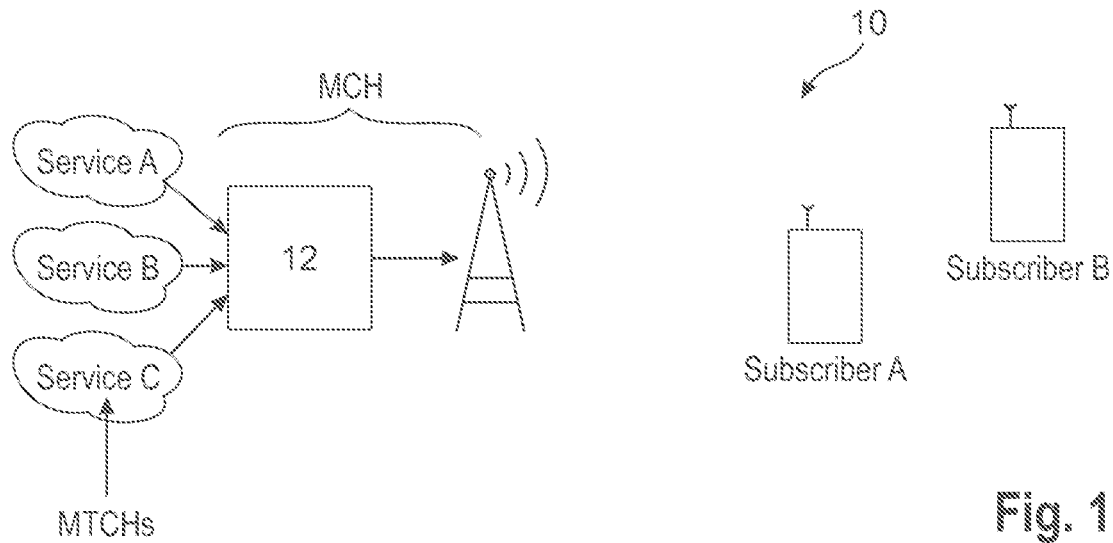
FIG. 1 schematically shows a system for controlling physical data rate according to an embodiment of the present disclosure, and FIG. 2 schematically shows a flow-chart that illustrates the method of controlling physical data rate according to an embodiment of the present disclosure.

In FIG. 1, a system 10 is shown that is used for controlling physical data rate for optimizing throughput of multiple multicast transport channels (MTCHs) associated with different services, namely Services A-C, for instance services that originate from different content providers and/or subscribers. The different services may be provided for different subscribers, for instance subscriber A and subscriber B as illustrated in FIG. 1. The different multicast transport channels are typically assigned to at least one multicast channel (MCH) that also encompasses a multicast control channel (MCCH) besides the multicast transport channels (MTCHs).

As shown in FIG. 1, the system 10 comprises at least one scheduling circuit or module 12 that is used to perform the respective scheduling of the multiple multicast transport channels with respect to the multicast channel in order to ensure that the different services are provided in an efficient manner Hence, the multicast transport channels are allocated to the at least one multicast channel wherein the respective allocation depends on the number and/or data rates of the individual multicast transport channels as well as the capacity of the multicast channel.

Figure 2:
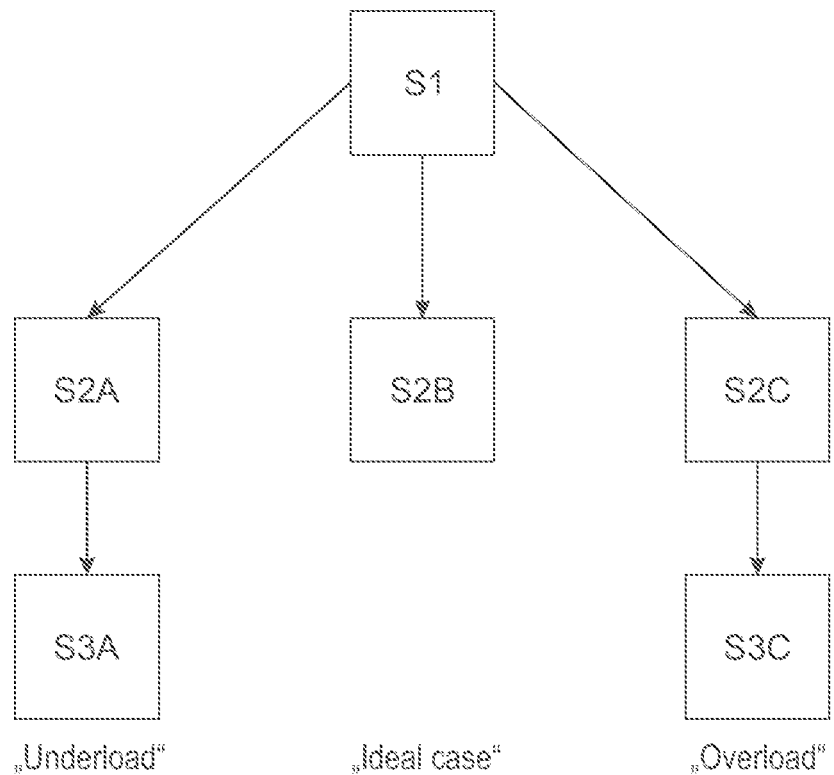

In FIG. 2, a flow-chart is shown that illustrates the scheduling/allocating of the individual multicast transport channels during a common sub-frame allocation period (CSAP), which is performed, for example, by the scheduling module 12.

In a first step S1, the scheduling module 12 checks the maximum available capacity (data rate) of the multicast channel as well as the individual data rates associated with the individual multicast transport channels that are intended for being allocated during the common sub-frame allocation period.

In case the scheduling module 12 determines that all multicast transport channels to be allocated currently, namely the ones intended for being allocated during the common sub-frame allocation period, fit into the multicast channel, all of the multicast transport channels to be allocated currently are placed within the multicast channel.

However, it is also evaluated by the scheduling module 12 if unused physical capacity (data rate) of the multicast channel is left irrespective of a capacity buffer be used by the multicast channel for different purposes.

Generally, the capacity buffer may be set by an operator of the system 10 or rather defined by a certain telecommunication standard that is used by the system 10. Accordingly, the capacity buffer may relate to a threshold set. For instance, the capacity buffer amounts to maximum 5% of the available capacity of the multicast channel, for example to maximum 2%.

When the scheduling module 12 determines that all of the multicast transport channels to be allocated currently fit into the multicast channel during the common sub-frame allocation period and, in addition, unused physical capacity (data rate) of the multicast channel is left, which exceeds the capacity buffer, an underload of the multicast channel is provided. This situation is illustrated by Step S2A in FIG. 2.

Accordingly, the scheduling module 12 will allocate at least one of the multicast transport channels to be allocated currently, namely the originally intended ones, as well as at least one waiting multicast transport channel, which is waiting for being allocated, to the different sub-frames associated with the multicast channel during the common sub-frame allocation period. This concerns a (re-)scheduling/allocating illustrated by step S3A in FIG. 2.

In other words, one of the multicast transport channels to be allocated currently is replaced by another one, namely a waiting multicast transport channel. The replaced multicast transport channel to be allocated currently is buffered for being scheduled later.

Usually, the replaced multicast transport channel to be allocated currently has a lower individual data rate compared to the waiting multicast transport channel, thereby ensuring that the overall data rate of the multicast transport channels, namely the combined data rates of the multicast transport channels, is closer to the maximum available capacity of the multicast channel. Thus, the unused physical capacity (data rate) of the multicast channel is minimized.

However, the number of multicast transport channels per multicast channel is stationary/constant since at least one of the multicast transport channels to be allocated currently has been replaced.

Accordingly, at least one of the currently scheduled multicast transport channels as well as at least one waiting multicast transport channel are processed/transmitted. In other words, a previous overload can be reduced appropriately since the at least one waiting multicast transport channel has been allocated, thereby reducing any backlog.

Generally, scenario "A" concerns an underload scenario.

In case the scheduling module 12 determines that all multicast transport channels to be allocated currently fit into the multicast channel while leaving no unused physical data rate in the multicast channel irrespective of a capacity buffer, no underload and no overload of the multicast channel takes place. This relates to an ideal scenario, as the substantially entire capacity of the multicast channel (despite the capacity buffer) is used by the originally scheduled multicast transport channels. In other words, no (re-)scheduling/allocating is necessary. This situation is illustrated by Step S2B in FIG. 2.

Generally, scenario "B" concerns an ideal case or rather an ideal scenario.

The scheduling module 12 may however also determine that all multicast transport channels to be allocated currently, namely originally scheduled, do not fit into the multicast channel since their summed data rate exceeds the maximum available capacity (data rate) of the multicast channel. This is illustrated by Step S2C in FIG. 2.

This scenario corresponds to an overload of the multicast channel as its capacity is not sufficient for all originally scheduled multicast transport channels such that a re-scheduling is necessary.

Accordingly, the scheduling module 12 applies a predefined ruling that may comprise several rules on the multicast transport channels to be allocated currently in order to identify multicast transport channels having a lower prioritization compared to other ones. This is illustrated by Step S3C in FIG. 2.

Hence, the decision which of the multicast transport channels to be allocated currently is postponed depends on the set of rules applied, thereby prioritizing the multicast transport channels to be allocated, as a respective prioritization is assigned to each of the multicast transport channels to be allocated. The respective prioritizations are taken into account in order to categorize the different multicast transport channels appropriately.

Then, only a certain set of all multicast transport channels to be allocated currently, for example only a single multicast transport channel, is placed within the multicast channel during the common sub-frame allocation period. This depends on the respective prioritization(s) of the multicast transport channel(s) as well as their data rate(s). Hence, the multicast transport channels to be allocated are placed within the multicast channel during the common sub-frame allocation period according to their individual prioritizations provided after applying the pre-defined ruling.

However, the number of multicast transport channels per multicast channel is maintained constant such that other multicast transport channels are allocated that have a lower individual data rate, thereby ensuring that the combined data rates of the multicast transport channels do not exceed the maximum available capacity (data rate) of the multicast channel.

Consequently, a remainder of the multicast transport channels to be allocated currently remains that could not be processed/transmitted during the common sub-frame allocation period due to the overload. Hence, the respective remainder is buffered and scheduled to be transmitted in a following common sub-frame allocation period.

For buffering the respective remainder, a buffer capacity is provided that is used for the excess multicast transport channels, namely the ones associated with the remainder.

Generally, scenario "C" concerns an overload scenario.

For instance, the at least one multicast transport channel associated with the remainder may be prioritized differently afterwards since it has been buffered. The re-prioritizing may ensure that the respective multicast transport channel associated with the remainder is prioritized higher in the following common sub-frame allocation period, for example in such a manner that the postponed multicast transport channel associated with the remainder will definitely be processed/transmitted in the following common sub-frame allocation period. In other words, the multicast transport channel associated with the remainder may only be postponed by one common sub-frame allocation period.

For instance, the prioritization is increased by one step each time the respective multicast transport channel is postponed.

In any case, an overload (scenario "C") as well as an underload (scenario "A") of the multicast channel caused by the multicast transport channels can be handled appropriately by one or more of the methods and systems described above. In an embodiment, the overload (scenario "C") as well as the underload (scenario "A") of the multicast channel caused by the multicast transport channels can be handled appropriately by, for example the scheduling module 12.

When handling the overload/underload of the multicast channel by (re-)scheduling the multicast transport channels, a protocol overhead caused in subsequent processing modules can be taken into account dynamically. Accordingly, any further processing causing additional bits/bytes, e.g., due to padding bits/bytes, is taken into consideration when (re-)scheduling/allocating the individual multicast transport channels.

In other words, the scheduling module 12 takes higher layer interaction into account during the when (re-)scheduling/allocating. Therefore, it is ensured that the overall physical data rate, namely the capacity of the physical multicast channel, is not exceeded.

Furthermore, the scheduling module 12 may also actively adjust sub-frame boundaries between adjacent sub-frames in order to increase the efficiency and the used data rate if necessary when (re-)scheduling/allocating the individual multicast transport channels.

Generally, multiple services can be scheduled efficiently while maximizing the used data rate in the multicast channel. In some embodiments, the used data rate approaches the maximum available capacity (data rate) of the multicast channel.

Moreover, the amount of sub-frames per multicast transport channel within one multicast channel may vary such that different amounts of sub-frames per multicast transport channel are provided during different common sub-frame allocation periods. Hence, a dynamic adaption may take place.

In addition, several multicast channels can be allocated during the common sub-frame allocation period. Thus, the several multicast transport channels may be allocated to several multicast channels simultaneously. Therefore, an interaction between different multicast channels may be performed as well.

Certain embodiments disclosed herein utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of hardware circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors, such as, for example, microprocessors, or portions thereof and accompanying software, firmware, hardware, and the like.

In some examples, the functionality described herein can be implemented by special purpose hardware-based computer systems or circuits, etc., or combinations of special purpose hardware and computer instructions. Each of these special purpose hardware-based computer systems or circuits, etc., or combinations of special purpose hardware circuits and computer instructions form specifically configured circuits, devices, etc., capable of implemented the functionality described herein.

Various embodiments of the present disclosure or the functionality thereof may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably). Such non-transitory computer-readable storage media include all computer-readable media (including volatile and non-volatile media).

Embodiments of the present disclosure may also take the form of an apparatus, system, computing device, computing entity, and/or the like executing instructions stored on computer-readable storage media to perform certain steps or operations. The computer-readable media include cooperating or interconnected computer-readable media, which exist exclusively on a processing or processor system or distributed among multiple interconnected processing or processor systems that may be local to, or remote from, the processing or processor system. However, embodiments of the present disclosure may also take the form of an entirely hardware embodiment performing certain steps or operations.

Various embodiments are described above with reference to block diagrams and/or flowchart illustrations of apparatuses, methods, systems, and/or computer program instructions or program products. It should be understood that each block of any of the block diagrams and/or flowchart illustrations, respectively, of portions thereof, may be implemented in part by computer program instructions, e.g., as logical steps or operations executing on one or more computing devices. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein.

These computer program instructions may also be stored in one or more computer-readable memory or portions thereof, such as the computer-readable storage media described above, that can direct one or more computers or computing devices or other programmable data processing apparatus(es) to function in a particular manner, such that the instructions stored in the computer-readable memory produce an article of manufacture including computer-readable instructions for implementing the functionality specified in the flowchart block or blocks.

It will be appreciated that the term computer or computing device can include, for example, any computing device or processing structure, including but not limited to a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

Of course, in some embodiments, two or more of these components, or parts thereof, can be integrated or share hardware and/or software, circuitry, etc. In some embodiments, these components, or parts thereof, may be grouped in a single location or distributed over a wide area. In circumstances where the components are distributed, the components are accessible to each other via communication links.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method of controlling physical data rate for optimizing throughput of multicast transport channels in at least one multicast channel, wherein at least one multicast transport channel is allocated to the at least one multicast channel during a common sub-frame allocation period, and wherein the allocation of the at least one multicast transport channel to the at least one multicast channel is controlled such that
- all multicast transport channels to be allocated currently are placed within one multicast channel during the common sub-frame allocation period when all multicast transport channels to be allocated can be accommodated by the one multicast channel during the common sub-frame allocation period, thereby leaving no unused physical data rate in the multicast channel irrespective of a capacity buffer,
- all multicast transport channels to be allocated currently and at least one multicast transport channel waiting to be allocated are placed within one multicast channel during the common sub-frame allocation period when all multicast transport channels to be allocated can be accommodated by the one multicast channel during the common sub-frame allocation period, thereby leaving unused physical data rate in the multicast channel, wherein the unused physical data rate exceeds the capacity buffer, and
- at least one of all multicast transport channels to be allocated currently is placed within one multicast channel during the common sub-frame allocation period according to a pre-defined ruling when all multicast transport channels to be allocated cannot be accommodated by the one multicast channel, wherein a remainder of all multicast transport channels to be allocated currently is buffered and scheduled to be transmitted in a following common sub-frame allocation period.

2. The method according to claim 1, wherein a protocol overhead caused in subsequent processing modules is dynamically taken into account when allocating the multicast transport channels to be allocated currently in order to not exceed an overall physical data rate.

3. The method according to claim 2, wherein the overall physical data rate of a broadcast channel used is not exceeded.

4. The method according to claim 1, wherein sub-frame boundaries are adjusted when allocating the at least one multicast transport channel to the at least one multicast channel.

5. The method according to claim 1, wherein the amount of sub-frames per multicast transport channel within one multicast channel is variable over several common sub-frame allocation periods.

6. The method according to claim 1, wherein the number of multicast transport channels within one multicast channel is variable over several common sub-frame allocation periods.

7. The method according to claim 1, wherein several multicast channels are allocated during the common sub-frame allocation period.

8. The method according to claim 1, wherein the accommodation of the multicast transport channels to be allocated currently into the one multicast channel relates to a comparison of a summed data rate of the multicast transport channels to be allocated currently with an overall capacity of the multicast channel.

9. The method according to claim 1, wherein the capacity buffer is set to a threshold.

10. The method according to claim 9, wherein the capacity buffer does not exceed 5% of the available capacity of the multicast channel.

11. The method according to claim 9, wherein the capacity buffer does not exceed 2% of the available capacity of the multicast channel.

12. The method according to claim 1, wherein the pre-defined ruling comprises a set of rules that is applied in order to prioritize the multicast transport channels to be allocated, thereby assigning a respective prioritization to each of the multicast transport channels to be allocated.

13. The method according to claim 12, wherein the multicast transport channels to be allocated are placed within the multicast channel during the common sub-frame allocation period according to their individual prioritizations.

14. The method according to claim 1, wherein a buffer capacity for excess multicast transport channels is provided.

15. The method according to claim 1, wherein each of the multicast transport channels is assigned to a respective service.

16. The method according to claim 15, wherein the services originate from different content providers and/or subscribers.

17. A system for controlling physical data rate for optimizing throughput of multiple multicast transport channels in at least one multicast channel, wherein the system comprises at least one scheduling circuit having circuitry configured to perform the method according to claim 1.

* * * * *